(12) United States Patent
Lev et al.

(10) Patent No.: US 7,345,871 B2
(45) Date of Patent: Mar. 18, 2008

(54) SYSTEM AND METHOD FOR LOCKING A TABLET COMPUTER DISPLAY

(75) Inventors: Jeffrey A. Lev, Cypress, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 11/047,902

(22) Filed: Feb. 1, 2005

(65) Prior Publication Data

US 2006/0171112 A1    Aug. 3, 2006

(51) Int. Cl.
*G06F 1/16*    (2006.01)
*E05D 3/10*    (2006.01)
*F16D 55/02*    (2006.01)

(52) U.S. Cl. ............ 361/681; 361/683; 361/686; 248/917; 16/367; 16/366; 16/327; 16/374; 188/71.7

(58) Field of Classification Search .......... 361/681, 361/683, 686; 248/917–922; 16/327, 366, 16/367, 374; 188/71.7
See application file for complete search history.

(56) References Cited

U.S. PATENT DOCUMENTS

| 5,870,283 | A | 2/1999 | Maeda et al. | |
| 6,185,095 | B1 | 2/2001 | Helot et al. | |
| 6,407,914 | B1 | 6/2002 | Helot | |
| 6,549,416 | B2 | 4/2003 | Sterner et al. | |
| 6,707,665 | B2 | 3/2004 | Hsu et al. | |
| 6,768,652 | B2 | 7/2004 | DeLuga | |
| 6,958,902 | B2 * | 10/2005 | Tseng et al. | 361/681 |
| 7,027,297 | B1 * | 4/2006 | Mizuno et al. | 361/683 |
| 7,123,472 | B2 * | 10/2006 | Huang et al. | 361/681 |
| 7,133,280 | B2 * | 11/2006 | Love | 361/681 |
| 2005/0198780 | A1 * | 9/2005 | Liu et al. | 16/367 |

FOREIGN PATENT DOCUMENTS

EP    001686447 A2 *   8/2006
JP    2006-216037    *   8/2006

* cited by examiner

Primary Examiner—Jayprakash Gandhi
Assistant Examiner—Zachary M Pape (57) ABSTRACT

Disclosed are systems and methods for locking a movable appendage (e.g., a display) of an electronic device (e.g., a tablet computer) comprising a rotational lock interfaced with a display hinge assembly of the display, and a docking member disposed to engage at least a portion of the rotational lock when the electronic device is interfaced with an external device.

36 Claims, 7 Drawing Sheets

FIG. 3D

SYSTEM AND METHOD FOR LOCKING A TABLET COMPUTER DISPLAY

DESCRIPTION OF RELATED ART

Mobile computing has experienced appreciable advancement in recent years. Accordingly, advancements have been made in the processing power, features, and form factors available with respect to mobile computing platforms. One relatively recent form factor advancement has been the "tablet" personal computer (PC).

Tablet PCs provide a mobile computing form factor in which a display device, e.g., a liquid crystal display (LCD), interfaces with a stylus or other hand-held pointing instrument to facilitate a user interacting with the computer in a manner emulating taking pen to paper. For example, one recent tablet PC configuration provides a mobile computing platform which appears very similar to a more traditional notebook computer, i.e., having a LCD display hingedly attached to a computer base unit, such that the LCD display closes against the computer base unit in a "clamshell" fashion. However, in contrast to a traditional notebook computer, the tablet PC configuration provides a mechanism by which the LCD display may be rotated 180° on its hinged attachment to the computer base unit, such that when the LCD display closes against the computer base unit the LCD display is exposed. A user may thus use the tablet PC, much like a notepad, by interacting with the LCD display using a stylus.

Advancements with respect to mobile computing has not been without difficulty, however. Although presenting a form factor which closely resembles a traditional notebook computer, and thus being readily acceptable to a large number of notebook computer users as well as being able to utilize peripherals and accessories designed for traditional notebook computers (e.g., tote bags, docking stations, etcetera), the tablet PC introduces various issues unique to its tablet configuration. For example, although a tablet PC configuration as described above may be able to interface with, and thus utilize, a docking station designed for use with a traditional notebook computer, the ability of a user to rotate the tablet PC's LCD display while the tablet PC is docked would likely not have been considered in the design of the docking station. Accordingly, rotation of the tablet PC's LCD display may cause damage to the display itself, the docking station, the hinge assembly attaching the LCD display to the computer base unit, or even the computer base unit, such as by striking a portion of the docking station during rotation.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
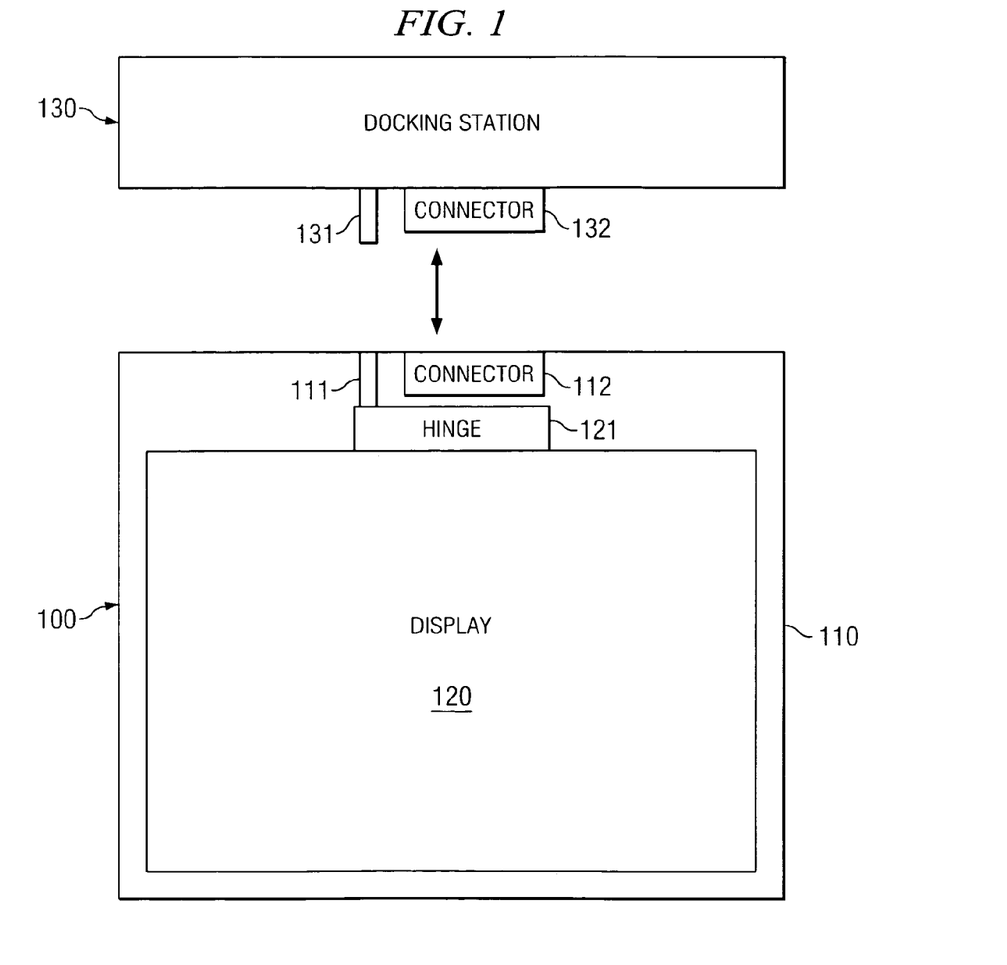
FIG. 1 shows a high level block diagram of an embodiment of the present invention.

Directing attention to FIG. 1, a high level functional block diagram of an embodiment of the present invention is shown. FIG. 1 shows tablet personal computer (PC) 100, such as may provide a clamshell notebook computer form factor. Tablet PC 100 comprises base unit 110, such as may comprise user input/output (e.g., keyboard, mouse touch pad, aural output, light-emitting diode (LED) output, and/or the like), a central processing unit (CPU), memory (e.g., random access memory (RAM), read only memory (ROM), disk drives (magnetic, optical, electronic, etcetera), and peripherals (e.g., modem, network interface card (NIC), wireless communications adaptor, expansion cards, and/or the like). Tablet PC 100 further comprises display 120, such as may comprise a liquid crystal display (LCD) or other user interface (e.g., plasma display, digitizing tablet, mouse touch pad, and/or the like). As will be better appreciated by the following discussion, display 120 of this embodiment of the invention provides for input by a user (e.g., touch screen, radio frequency (RF) stylus input, etcetera) as well as output to a user (e.g., visual display, aural output, etcetera).

Tablet PC 100 of embodiments provides a mobile computing form factor in which display 120 interfaces with a stylus or other hand-held pointing instrument to facilitate a user interacting with tablet PC 100 in a manner emulating taking pen to paper. However, tablet PCs implementing embodiments of the present invention may provide functionality in addition to or in the alternative to the aforementioned functionality.

Display 120 is attached to base unit 110 via hinge assembly 121. Hinge assembly 121 of embodiments of the invention not only provides for hinged movement of display 120 between a closed clamshell position (i.e., closed against base unit 110) and an open clamshell position (e.g., opened some distance away from base unit 110), but also provides for rotational movement. For example, hinge assembly 121 may provide for 180° rotational movement of display 120, such that when disposed at 0° and placed in the closed clamshell position a display face of display 120 is facing toward a keyboard surface of base unit 110 (i.e., the display face is protected inside of the closed clamshell) and when disposed at 180° and placed in the closed clamshell position a display face of display 120 is facing away from a keyboard surface of base unit 110 (i.e., the display face is exposed outside of the closed clamshell). Accordingly, the aforementioned 0° position of this example corresponds to a typical notebook computer configuration and the aforementioned 180° position corresponds to a tablet PC configuration.

Referring still to FIG. 1, docking station 130 is shown which may interface with tablet PC 100, providing connectivity thereto (e.g., providing external ports for keyboard, mouse, universal serial bus (USB), display, network, printer, power supply, etcetera). Electronic interfacing and signaling between tablet PC 100 and docking station 130 is provided via connectors 112 and 132. Mechanical interfacing, such as to provide proper alignment between tablet PC 100 and docking station 130 and latching of tablet PC 100 to docking station 130, may additionally be provided.

Example docking station 130 presents a physical obstruction to rotation of display 120 between the 0° position and the 180° position when tablet PC 100 is interfaced with docking station 130, e.g., docking station 130 may comprise a form factor developed for a traditional notebook computer model and, thus, present a surface extending above base unit 110 sufficiently high to prevent display 120 from being rotated-between 0° and 180°. Accordingly, although it might otherwise be desirable to utilize a legacy docking station configuration with respect to tablet PC 100, such use may lead to damage of tablet PC 100 and/or docking station 130 if a user attempts to rotate display 120 while tablet PC 100 is interfaced with docking station 130.

Embodiments of the present invention comprise a locking mechanism for locking rotational movement of display 120 when tablet PC 100 is interfaced with docking station 130. According to embodiments of the invention, the foregoing locking mechanism locks rotational movement of display 120 without interfering with hinged clamshell movement of display 120. The foregoing locking mechanism is shown as comprising rotational lock 111 and docking member 131.

In operation, according to embodiments of the invention, monitor 120 is rotated to a predetermined desired position, such as 0° for use in a traditional notebook computer configuration or 180° for use in a tablet configuration, and tablet PC 100 is moved to engage docking station 130. Docking member 131 engages a portion of rotational lock 111 as tablet PC 100 engages docking station 130. Docking member 131 engaging rotational lock 111 causes rotational lock 111 to engage a rotational portion of hinge 121, to thereby prevent display 120 from being rotated between 0° and 180°, when tablet PC 100 is interfaced with docking station 130 according to an embodiment of the invention. Likewise, in some embodiments, a spring or other bias mechanism causes rotational lock 111 to disengage the rotational portion of hinge 121, to thereby enable display 120 to be rotated between 0° and 180°, when tablet PC 100 is removed from docking station 130 according to an embodiment of the invention.

The above-described operation of a locking mechanism of an embodiment of the present invention provides for locking of display 120 in a current rotational position without express or deliberate manipulation of the locking mechanism by a user. Instead, the action of the user interfacing tablet PC 100 with docking station 130 engages the locking mechanism. Accordingly, a user need not actively remember to lock and unlock the rotational movement of display 120 in order to prevent its being damaged when tablet PC 100 is docked with docking station 130.

Embodiments of the present invention may further operate to prevent tablet PC 100 from fully interfacing with docking station 130 when display 120 is not disposed in at least one predetermined position. For example, rotational lock 111 may be prevented from moving by hinge 121 when display 120 is disposed in particular positions (e.g., positions other than 0° and 180°). Because rotational lock 111 is prevented from moving, docking member 131 prevents tablet PC 100 from engaging with docking station 130. Such embodiments are utilized to prevent damage to display 120 from impacting a portion of docking station 130 due to display 120 not being in at least one predetermined position; e.g., being in a position not suitable for engaging with docking station 130.

Embodiments of the present invention may implement a configuration for use with legacy docking stations. Such legacy docking stations are not specifically adapted to provide rotational locking of display 120. For example, docking member 131 may comprise an alignment guide pin of a legacy docking station, such as may have originally been provided solely to guide a computer to properly connect with connector 132 when interfacing with docking station 130, or other legacy docking station structure. Embodiments of rotational lock 111 may therefore be adapted to provide the desired locking engagement with a portion of hinge 121 when engaging such legacy docking station structure. Such an embodiment enables the use of legacy docking stations, without alteration, to provide rotational locking according to embodiments of the invention.

Alternatively, a legacy docking station configuration may be adapted, such as during manufacture or through a retrofit procedure, to include a docking member specifically designed to interface with rotational lock 111 according to embodiments of the invention. It will be appreciated that a docking station configuration may be specifically designed to implement concepts of the present invention. Such embodiments may be advantageous where substantial mechanical movement of rotational lock 111 is desired or where orthogonality of motion between the tablet PC docking interface action and the rotational locking engagement is desired (e.g., where interfacing tablet PC 100 with docking station 130 involves mostly vertical movement and rotational locking engagement involves mostly horizontal movement).

Rotational lock 111 and docking member 131 may be made from any number of materials, such as plastics, composites, and/or metals, in any number of configurations. The materials from which rotational lock 111 and docking member 131 are made need not be the same. For example, docking member 131 may be comprised of metal, whereas rotational lock 111 may be comprised of a composite material. However, the materials used with respect to rotational lock 111 and docking station 131 should be sufficiently durable according to embodiments of the invention to resist a rotational force applied to monitor 120 by a user thereof when rotational lock 111 is in an engaged position.

Figure 2A:
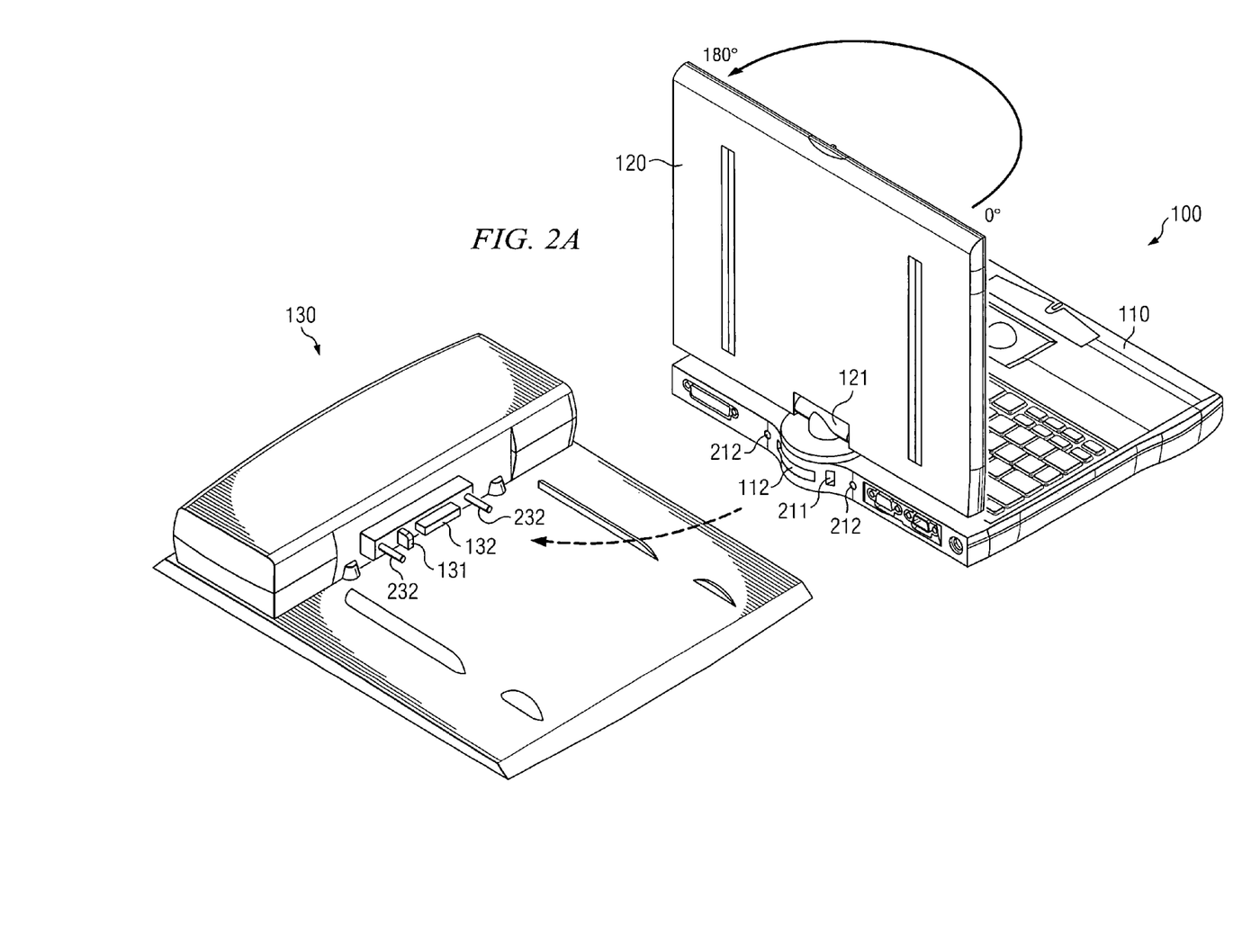
FIGS. 2A-2C show detail with respect to an embodiment of the present invention.
Figure 2B:
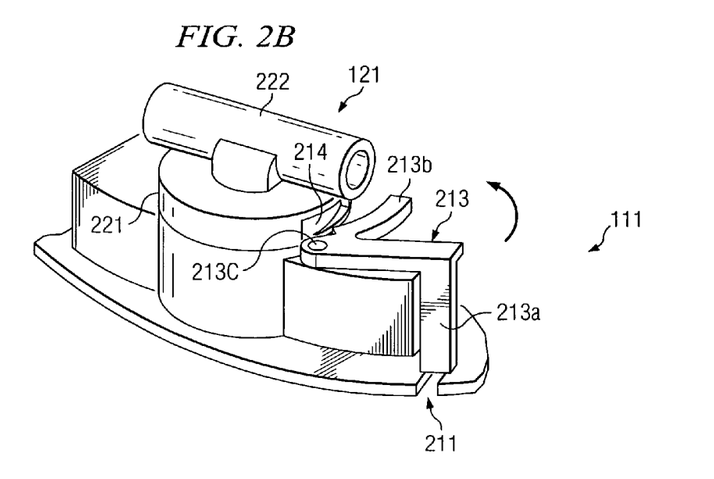
Figure 2C:
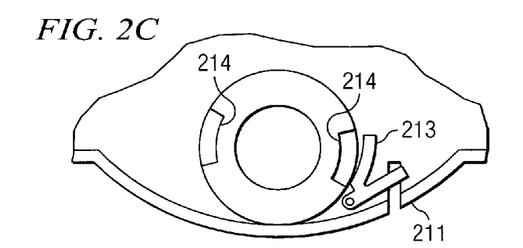

FIGS. 2A-2C show detail with respect to a locking mechanism for locking rotational movement of display 120 when tablet PC 100 is interfaced with docking station 130 according to one embodiment of the invention. Docking station 130 of FIG. 2A is adapted to interface with tablet PC 100 through mostly horizontal interfacing movement. Through such movement, connector 132 (shown here as a male connector) will interface with connector 112 (shown here as a female connector) to provide electrical and signaling connections between tablet PC 100 and docking station 130. Guide pins 232 of docking station 130 interface with guide holes 212 of tablet PC 100 to assist in guiding the horizontal movement of tablet PC 100 during interfacing with docking station 130. Docking member 131, shown here as a rib appended to docking station 130, protrudes through locking mechanism receiver 211 of tablet PC 100 to interface with rotational lock 111, internal to tablet PC 100 of this embodiment, and provides mostly horizontal rotational lock movement.

FIG. 2B shows additional detail with respect to hinge 121 and rotational lock 111. Hinge 121 of the illustrated embodiment comprises disk 221 adapted to provide rotational movement to display 120 and barrel 222 for providing hinged movement to display 120. Rotational lock 111 of the illustrated embodiment comprises brake 213 adapted to engage brake seat 214 disposed in disk 221. As docking member 131 enters receiver 211, arm 213a of brake 213 is engaged causing brake 213 to rotate about pivot 213c, resulting in brake member 213b engaging brake seat 214. When brake member 213b is engaged with brake seat 214, rotational movement of display 120 provided about disk 221 is prevented, although hinged movement of display 120 provided about barrel 222 is not impeded.

As may be best seen in FIG. 2C, the configuration of brake seat 214 within disk 221 provides an embodiment wherein brake member 213b prevents rotation of brake 213 about pivot 213c when display 120 is rotated in particular positions. Accordingly, the embodiment of FIG. 2C may operate to prevent tablet PC 100 from fully interfacing with docking station 130 when display 120 is not disposed in predetermined positions, such as 0° or 180°.

Although brake member 213*b* engaging brake seat 214 of embodiments may present a block to rotation of display 120 in only one direction (e.g., clockwise), embodiments of the invention cooperate with a rotational stop of hinge 121 to present a block to rotation of display 120 in two directions (e.g., clockwise and counter-clockwise). For example, hinge 121 may comprise rotational stops at 0° and 180° to prevent 360° rotation, or other over-rotation, of display 120, possibly resulting in damage to signal cables etcetera. Accordingly, through normal operation of hinge 121, display 120 may be stopped at a 0° position, enabling rotation in the positive direction (e.g., clockwise) to 180° but not rotation in the negative direction (e.g., counter-clockwise). When rotational lock 111 is engaged, rotation in the positive direction would also be blocked according to embodiments of the invention. Alternatively, display 120 may be stopped at a 180° position, enabling rotation in the negative direction (e.g., counter-clockwise) to 0° but not rotation in the positive direction (e.g., clockwise). When rotational lock 111 is engaged, rotation in the negative direction would also be blocked according to embodiments of the invention.

Although the illustrated embodiment has been described with reference to a rib configuration of docking member 131, embodiments of the present invention may implement any number of docking member configurations which provide sufficient movement of a corresponding portion of rotational lock 111. For example, some embodiments of the present invention may utilize a guide pin, such as guide pin 232, disposed in juxtaposition with a corresponding portion of rotational lock 111 to provide the aforementioned operational engagement.

As can be seen in FIG. 2C, an embodiment of locking mechanism 111 comprises a plurality of brake seats to provide for locking display 120 in any of a number of rotational positions. For example, a first one of brake seats 214 shown in FIG. 2C may correspond to display 120 being disposed at a 0° position, whereas a second one of brake seats 214 shown in FIG. 2C may correspond to display 120 being disposed at a 180° position. Other embodiments of the invention may provide brake seats at any desired position (i.e., predetermined positions in addition to or in the alternative to 0° and 180°) and in any number (i.e., more or less than two brake seats).

Figure 3A:
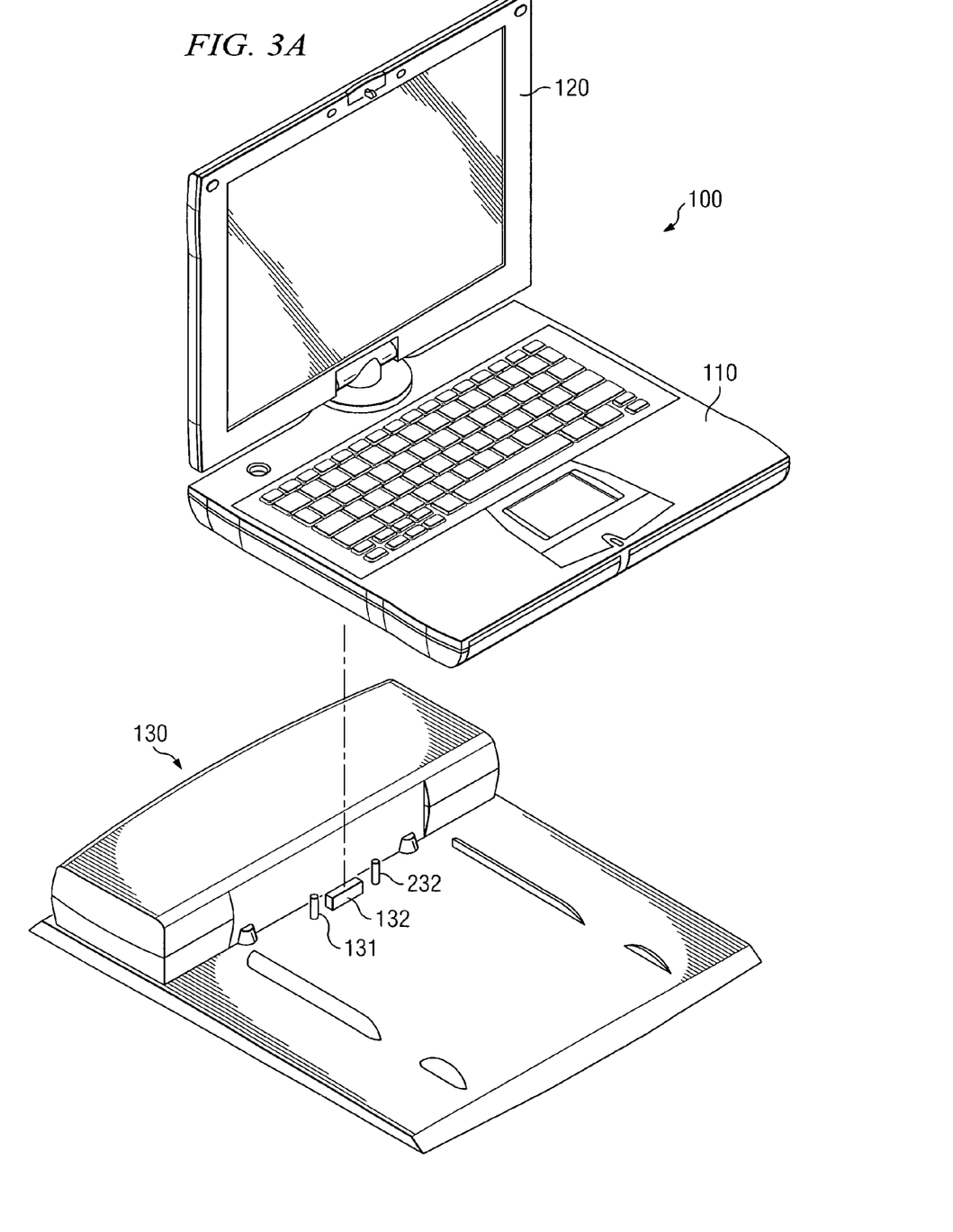
FIGS. 3A-3D show detail with respect to an alternative embodiment of the present invention.

FIGS. 3A-3D show detail with respect to a locking mechanism for locking rotational movement of display 120 when tablet PC 100 is interfaced with docking station 130 according to another embodiment of the invention. Docking station 130 of FIG. 3A is adapted to interface with tablet PC 100 through mostly vertical interfacing movement. Through such movement, connector 132 (shown here as a male connector) interfaces with connector 112 of tablet PC 100 to provide electrical and signaling connections between tablet PC 100 and docking station 130. Guide pin 232 of docking station 130 interfaces with a corresponding guide hole of tablet PC 100 to assist in guiding the horizontal movement of tablet PC 100 during interfacing with docking station 130. Docking member 131, shown here as a pin appended to docking station 130, protrudes through a locking mechanism receiver of tablet PC 100 to interface with rotational lock 111, internal to tablet PC 100 of this embodiment, and provides mostly vertical rotational lock movement.

Figure 3B:
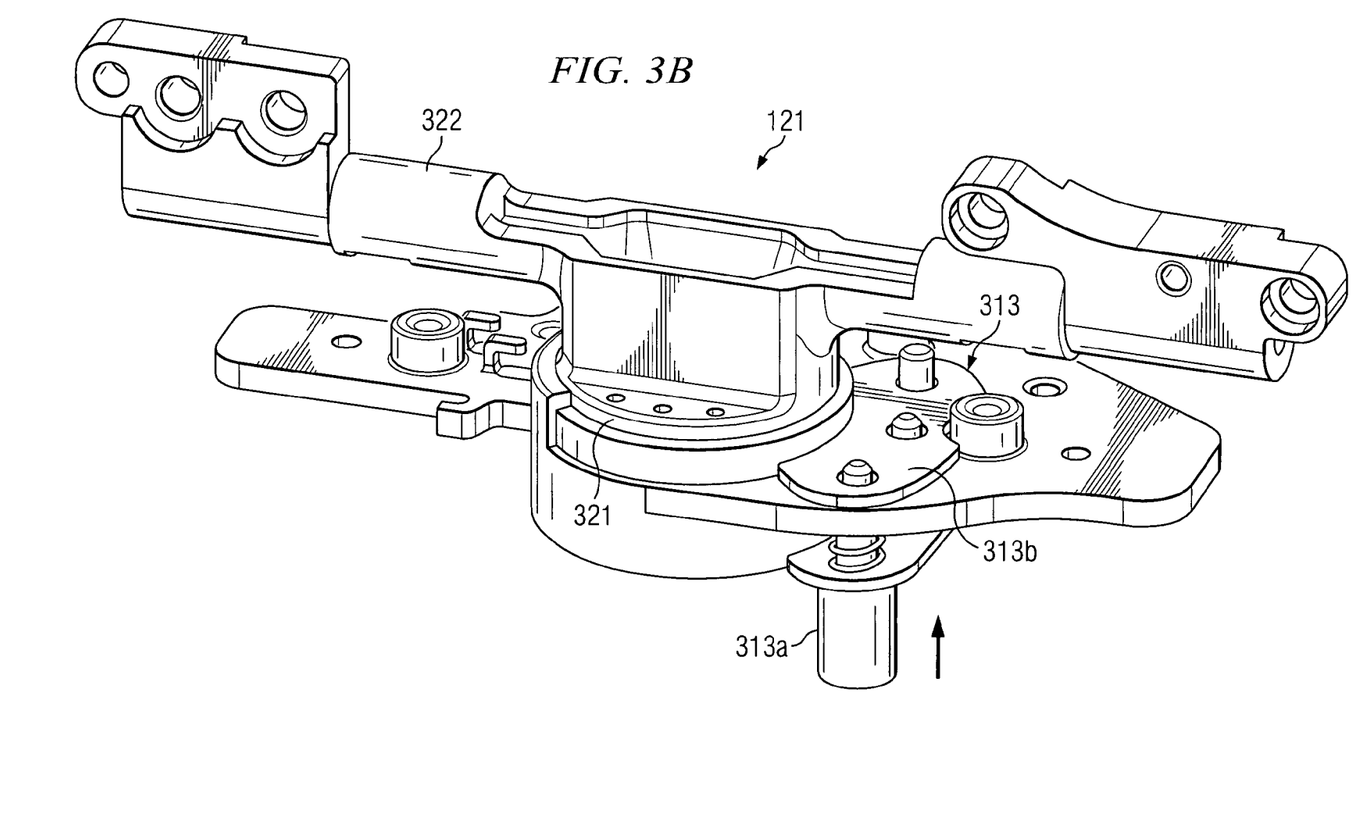

FIG. 3B shows additional detail with respect to hinge 121 and rotational lock 111. Hinge 121 of the illustrated embodiment comprises disk 321 for providing rotational movement to display 120 and barrel 322 for providing hinged movement to display 120. Rotational lock 111 of the illustrated embodiment comprises brake 313 adapted to engage brake seat 314 (FIG. 3D) disposed in disk 321. As docking member 131 enters the locking mechanism receiver, plunger 313*a* of brake 313 is engaged, causing brake plate 313*b* of brake 313 to lift, resulting in brake plate 313*b* engaging brake seat 314. When brake plate 313*b* is engaged with brake seat 314, rotational movement of display 120 provided about disk 321 is prevented, although hinged movement of display 120 provided about barrel 322 is not impeded.

Although brake plate 313*b* engaging brake seat 314 of embodiments may present a block to rotation of display 120 in only one direction (e.g., clockwise), embodiments of the invention cooperate with a rotational stop of hinge 121 to present a block to rotation of display 120 in two directions (e.g., clockwise and counter-clockwise). For example, through normal operation of hinge 121, display 120 may be stopped at a 0° position, enabling rotation in the positive direction (e.g., clockwise) to 180° but not rotation in the negative direction (e.g., counter-clockwise). When rotational lock 111 is engaged, rotation in the positive direction would also be blocked according to embodiments of the invention. Alternatively, display 120 may be stopped at a 180° position, enabling rotation in the negative direction (e.g., counter-clockwise) to 0° but not rotation in the positive direction (e.g., clockwise). When rotational lock 11 is engaged, rotation in the negative direction would also be blocked according to embodiments of the invention.

The pin configuration of docking member 131 described above with respect to the illustrated embodiment may comprise a guide pin of docking station 130. For example, docking station 130 may not have been specifically adapted for providing rotational locking according to the present invention, but rather may comprise a legacy device. A docking station interface guide pin may be utilized in providing rotational locking as described herein. Of course, other configurations of docking member 131, such as a rib configuration, a ramp configuration, an arm configuration, etcetera, may be utilized according to embodiments of the invention.

Brake seat 314 of embodiments of the present invention may be provided upon disk 321 to provide a rotational stop in order to prevent display 120 from rotating more than a predetermined amount (e.g., 180° or 360°). However, brake 313 may be configured to engage this same brake seat in order to lock display 120 in a desired rotational position while interfaced with docking station 130. Accordingly, embodiments of tablet PC 100 comprise rotational lock 111 that utilizes a configuration of hinge 121 substantially unchanged, although components of rotational lock 111 and a locking mechanism receiver are added to tablet PC 100.

Embodiments of locking mechanism 111 as shown in FIGS. 3A-3D may comprise a plurality of brake seats to provide for locking display 120 in any of a number of rotational positions. For example, as with the embodiment described with reference to FIGS. 2A-2C, a first brake seat may correspond to display 120 being disposed at a 0° position and a second brake seat may correspond to display 120 being disposed at a 180° position.

Figure 3C:
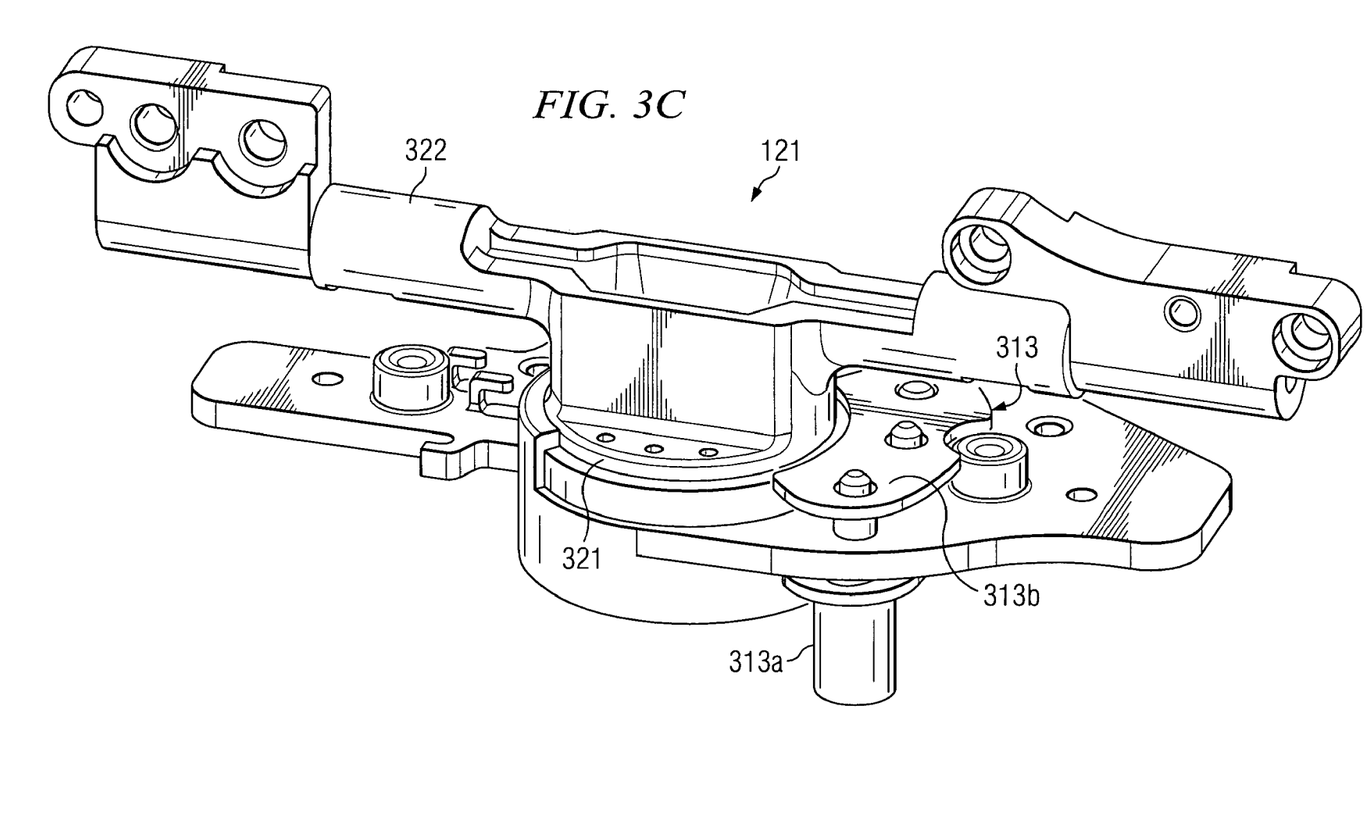
Figure 3D:
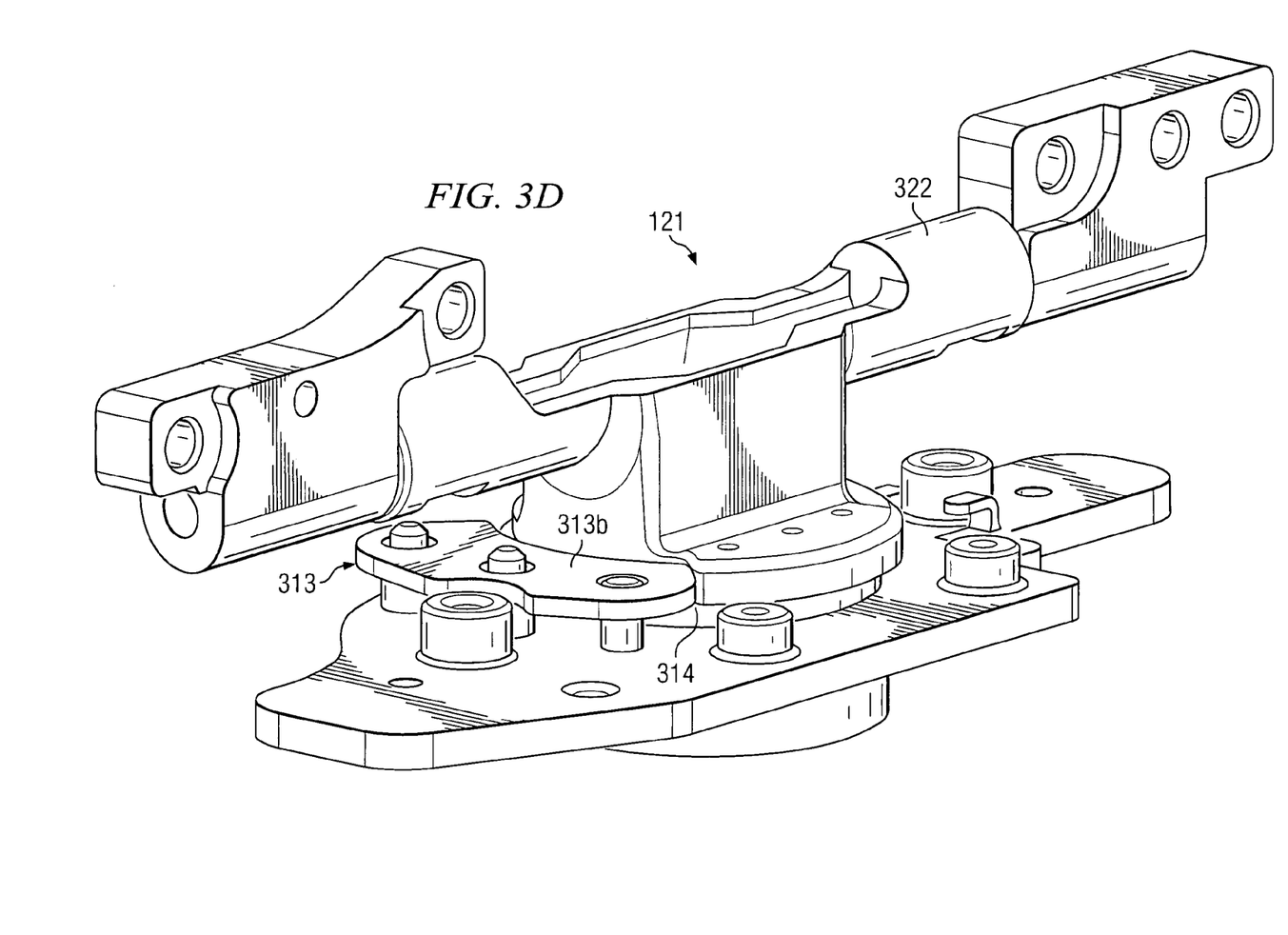
Figure 4:
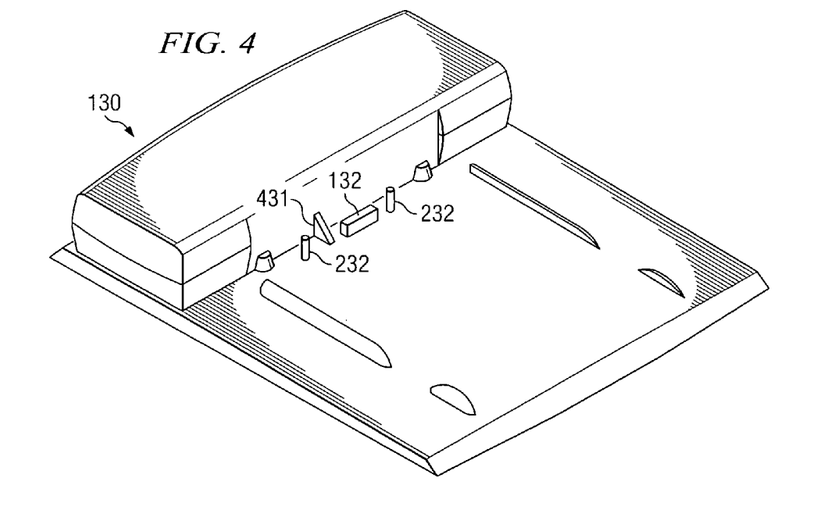
FIG. 4 shows an alternative embodiment of a docking station used with respect to the rotational lock embodiment of FIGS. 2A-2C.

The embodiments illustrated in FIGS. 2A-2C and 3A-3D utilize movement of a portion of locking mechanism 111 in a direction corresponding to the direction of motion provided when interfacing tablet PC 100 with docking station 130 (e.g., mostly horizontal movement in the embodiment of FIGS. 2A-2C and mostly vertical movement in the embodiment of FIGS. 3A-3C). Embodiments of the present invention engage at least a portion of the rotational lock by the docking member to provide movement of at least a portion of the rotational lock in a direction planarly parallel to a direction of movement when interfacing the tablet computer with the external device. However, embodiments of the present invention may provide a change in direction of motion for engaging a locking mechanism, if desired. FIG. 4 shows an alternative configuration of docking station 130 of the embodiment of FIGS. 2A-2C where interfacing tablet PC 100 with docking station 130 instead involves vertical movement and rotational locking engagement still involves horizontal movement (i.e., orthogonality of motion between the tablet PC docking interface action and the rotational locking engagement). Alternately, some embodiments of the present invention engage at least a portion of the rotational lock by the docking member provides movement of at least a portion of the rotational lock in a direction generally orthogonal to a direction of movement interfacing the tablet computer with the external device. Docking member 431 of FIG. 4 provides a ramp configuration wherein arm 213a (FIG. 2B) of brake 213 is engaged through vertical movement of tablet PC 100, but because of the ramped surface of docking member 431, brake 213 is caused to rotate about pivot 213c resulting in brake member 213b engaging brake seat 214. Accordingly, it will be appreciated that some embodiments of the present invention (e.g., the embodiment of FIGS. 2A-2C) are selectively adapted to engage at least a portion of the rotational lock by docking member to provide movement of at least a portion of the rotational lock in either a direction which is planarly parallel or generally orthogonal to a direction of movement when interfacing the tablet computer with the external device—thereby giving such embodiments the flexibility to dock depending upon the particular external device encountered.

Although embodiments have been described herein with reference to a tablet PC interfacing with a docking station, it should be appreciated that the concepts of the present invention are applicable to other uses and systems. For example, rather than a docking station, a tablet PC may be interfaced with a charger stand, a portable desk structure, a peripheral (e.g., printer, scanner, projector, etcetera), and/or the like. Accordingly, docking station 130 shown herein may comprise any number of devices external to tablet PC 100, such as one or more of the aforementioned charger stand, portable desk structure, printer, scanner, and projector. Rather than a tablet PC, embodiments of the present invention may be utilized to provide rotational locking with respect to a display or other movable appendage (e.g., lid, pop-up, display panel, cover, speakers, etcetera) of various electronic devices and/or mobile computing platforms.

What is claimed is:

1. A system for locking a display of a tablet computer, said system comprising:
   a rotational lock interfaced with a display hinge assembly of said display; and
   a docking member disposed to engage at least a portion of said rotational lock when said tablet computer is interfaced with an external device.

2. The system of claim 1, wherein said rotational lock comprises:
   a brake which interfaces with a brake seat of said hinge assembly.

3. The system of claim 2, wherein said brake comprises a brake arm which rotates about a pivot.

4. The system of claim 2, wherein said brake comprises a brake plate which is lifted into a braking position.

5. The system of claim 2, wherein said brake seat comprises a brake seat structured to prevent over-rotation of said display.

6. The system of claim 1, wherein said engaging said at least a portion of said rotational lock by said docking member provides movement of said at least a portion of said rotational lock in a direction planarly parallel to a direction of movement interfacing said tablet computer with said external device.

7. The system of claim 1, wherein said engaging said at least a portion of said rotational lock by said docking member provides movement of said at least a portion of said rotational lock in a direction generally orthogonal to a direction of movement interfacing said tablet computer with said external device.

8. The system of claim 1, wherein said engaging said at least a portion of said rotational lock by said docking member accommodates both movement of said at least a portion of said rotational lock in a direction planarly parallel to a direction of movement interfacing said tablet computer with said external device and movement of said at least a portion of said rotational lock in a direction generally orthogonal to a direction of movement interfacing said tablet computer with said external device.

9. The system of claim 1, wherein said docking member comprises a structure extending from a surface of said eternal device.

10. The system of claim 9, wherein said structure comprises a rib protrusion.

11. The system of claim 9, wherein said structure comprises a pin protrusion.

12. The system of claim 9, wherein said structure comprises a ramp protrusion.

13. The system of claim 9, wherein said structure comprises an interface guide pin.

14. The method of claim 1, wherein said docking member is a part of said external device.

15. The method of claim 1, wherein said rotational lock is a part of said tablet computer.

16. The system of claim 1, wherein said external device is selected from the group consisting of a docking station, a charger stand, a portable desk structure, a printer, a scanner, and a projector.

17. The system of claim 1, wherein said rotational lock and said docking member are adapted to cooperate to prevent said tablet computer from interfacing with said external device when said tablet computer display is rotationally disposed in at least one predetermined position.

18. A method for locking a display of a tablet computer, said method comprising:
   interfacing said tablet computer with an external device; and
   engaging a rotational lock, interfaced with a display hinge assembly of said display, by a docking member disposed to engage at least a portion of said rotational lock when said tablet computer is interfaced with said external device.

19. The method of claim 18, wherein said engaging said rotational lock comprises:
   rotating a brake arm about a pivot.

20. The method of claim 18, wherein said engaging said rotational lock comprises:
   lifting a brake plate into a braking position.

21. The method of claim 18, further comprising:
   preventing rotational movement in a first direction using a brake seat provided to prevent over-rotation of said display.

22. The method of claim 18, wherein said engaging said rotational lock prevents rotational movement in a direction different than rotational movement prevented by a brake seat providing over-rotation of said display.

23. The method of claim 18, further comprising:
    rotating said display to a desired position prior to said interfacing said tablet computer with said external device.

24. The method of claim 23, wherein said rotating said display comprises:
    positioning said display in a tablet configuration position.

25. The method of claim 23, wherein said rotating said display comprises:
    positioning said display in a notebook configuration position.

26. The method of claim 18, further comprising:
    selecting said external device from the group consisting of a docking station, a charger stand, a portable desk structure, a printer, a scanner, and a projector.

27. The method of claim 18, further comprising:
    preventing said tablet computer from fully interfacing with said external device when said tablet computer display is rotationally disposed in at least one predetermined position.

28. A system for preventing rotation of a display of a tablet computer, said system comprising:
    means for preventing rotational movement of a portion of a display hinge assembly in at least one direction of rotation when said tablet computer is docked with an external device; and
    means for engaging said means for preventing rotational movement when said tablet computer is interfaced with said external device.

29. The system of claim 28, wherein said means for preventing rotational movement further comprises:
    means for preventing over-rotation of said display in a first rotational direction.

30. The system of claim 28, further comprising:
    means for preventing said tablet computer from docking with said external device when said display is oriented in at least one predetermined position.

31. The system of claim 28, wherein said external device comprises a docking station.

32. A system for locking a movable appendage of an electronic device in a predetermined position, said system comprising:
    a rotational lock interfaced with a hinge assembly of said appendage; and
    a docking member disposed to engage at least a portion of said rotational lock when said electronic device is interfaced with an external device.

33. The system of claim 32, wherein said rotational lock and said docking member are adapted to cooperate to prevent said electronic device from interfacing with said external device when said appendage is rotationally disposed in at least one predetermined position.

34. A method for locking a movable appendage of an electronic device in a predetermined, said method comprising:
    interfacing said electronic device with an external device; and
    engaging a rotational lock, interfaced with a hinge assembly of said appendage, by a docking member disposed to engage at least a portion of said rotational lock when said electronic device is interfaced with said external device.

35. The method of claim 34, further comprising:
    rotating said appendage to a desired position prior to said interfacing said electronic device with said external device.

36. The method of claim 34, further comprising:
    preventing said electronic device from fully interfacing with said external device when said appendage is rotationally disposed in at least one predetermined position.

* * * * *

UNITED STATES PATENT AND TRADEMARK OFFICE
CERTIFICATE OF CORRECTION

| | | |
|---|---|---|
| PATENT NO. | : 7,345,871 B2 | Page 1 of 1 |
| APPLICATION NO. | : 11/047902 | |
| DATED | : March 18, 2008 | |
| INVENTOR(S) | : Jeffrey A. Lev et al. | |

It is certified that error appears in the above-identified patent and that said Letters Patent is hereby corrected as shown below:

In column 6, line 28, delete "11" and insert -- 111 --, therefor.

Signed and Sealed this

Twenty-ninth Day of July, 2008

JON W. DUDAS
*Director of the United States Patent and Trademark Office*